United States Patent [19]

Wald, Robert D.

[11] Patent Number: 4,638,935
[45] Date of Patent: Jan. 27, 1987

[54] PAPER FEED TRACTOR WITH BELT TENSIONING

[75] Inventor: Wald, Robert D., Harwinton, Conn.

[73] Assignee: Data Motion, Incorporated, Torrington, Conn.

[21] Appl. No.: 416,859

[22] Filed: Sep. 10, 1982

[51] Int. Cl.$^4$ .............................................. B65H 20/22
[52] U.S. Cl. ........................................ 226/171; 226/74
[58] Field of Search ................... 226/74, 75, 170, 171, 226/172, 173; 198/628, 814; 474/111, 133, 134, 136, 137, 138, 140

[56] References Cited

U.S. PATENT DOCUMENTS

| | | | |
|---|---|---|---|
| 1,429,991 | 9/1922 | Wilkes et al. | 198/628 |
| 1,669,272 | 5/1928 | Wilkes et al. | 198/628 |
| 2,140,028 | 12/1938 | Nichols | 226/74 X |
| 2,261,316 | 11/1941 | Weller | 474/111 |
| 2,884,120 | 4/1959 | Bruestle | 226/172 |
| 3,113,823 | 12/1963 | Phillips | 226/75 X |
| 3,386,565 | 6/1968 | Carter | 226/170 X |
| 3,608,801 | 9/1971 | Nystrand | 226/74 |
| 3,610,500 | 1/1970 | Brown | 226/172 |
| 3,669,327 | 6/1972 | Dowd | 226/74 X |
| 3,688,959 | 9/1972 | Staneck et al. | 226/75 |
| 3,739,970 | 6/1973 | Staamann | 226/75 |
| 3,938,721 | 2/1976 | Staneck et al. | 226/75 |
| 4,199,091 | 4/1980 | Hubbard | 226/74 |
| 4,214,691 | 7/1980 | Van Namen | 226/74 |
| 4,226,353 | 10/1980 | Blaskovic et al. | 226/74 |

FOREIGN PATENT DOCUMENTS 649199 1/1951 United Kingdom .

Primary Examiner—Harvey C. Hornsby
Assistant Examiner—Scott J. Haugland

[57] ABSTRACT

A tractor for a web feeding assembly has a chassis providing a pair of apertures extending therethrough and a belt extending thereabout. A drive pulley mounted in one of the chassis apertures is engaged with the driven surface of the belt and has an aperture therethrough receiving the drive shaft. Convexly arcuate belt support means cooperates with the drive pulley to define the web drive path for the belt therebetween, and a cover on the chassis overlies the belt and web drive path. An integrally formed belt tensioning means is movably supported on the chassis below the drive path for resiliently biasing the belt against the guide means. The belt tensioning means includes a support plate portion and at least one resiliently deflectable leg portion depending therefrom and slidably seated in a recess in the tractor chassis. As a result, pressures on the belt during operation of the tractor tending to produce deflection away from the cover are resisted by the belt tensioning means to maintain a rectilinear drive path for the web tightly against the cover.

18 Claims, 11 Drawing Figures

PAPER FEED TRACTOR WITH BELT TENSIONING

CROSS-REFERENCE TO RELATED APPLICATION

The present application is directed to an improved belt tensioning mechanism of the type generically claimed in the concurrently filed application of Alan F. Seitz, Ser. No. 416,682 filed Sept. 10, 1982.

BACKGROUND OF THE INVENTION

The present invention relates to drive tractors which are widely used in printers and other devices for handling webs such as continuous perforated paper, individual sheet paper, tape and the like, fabricated of paper, foil, laminates and other sheet-like material, all collectively referred to hereinafter as "web material".

Generally such devices employ a belt which will engage the web material either by pins or projections on the upper surface of the belt extending into perforations in the web material, or by friction or "clamping" of the web material between the upper surface of the belt and a cover or guide thereabove. Such devices are in widespread use for the applications indicated above and are particularly burgeoning in usage for paper handling in printers for computers, word processing and duplicating apparatus.

In Seitz U.S. Pat. No. 4,130,23 granted Dec. 19, 1978; U.S. Pat. No. 4,194,660 granted Mar. 25, 1980; and U.S. Pat. No. 4,315,585 granted Feb. 16, 1982, there are illustrated and described tractors of this type employing a one-piece integrally molded continuous synthetic resin belt traveling in a continuous path about a drive sprocket or pulley with which it is drivingly engaged and a cooperating arcuate surface, which is generally a second pulley or sprocket which idles. The paper or other web is driven by the belt as it passes between it and an overlying cover. The belt desirably has a diameter sufficient to provide a linear length between the pulleys greater than the rectilinear length therebetween so that the excess length will absorb stresses on the belt during operation. This type of one-piece molded belt has an inherent tendency to arch outwardly between the drive pulley and cooperating arcuate surface because of its memory resulting from its being molded as a circle. As a result, the web is biased upwardly against the cover, and the web is fully seated on the drive pins on the upper surface of the belt.

Particularly in tractors which rapidly intermittently move the web, or which rapidly move it backwards as well as forwards, both common as in printers, it is desirable to provide some slack in the belt between its guide surfaces to absorb some of the forces resulting from the rapid reversal or termination of drive motion. However, it is also desirable to avoid downward deflection of the belt between the guide surfaces to ensure that the belt holds the web tightly against the cover and thereby firmly seated on the drive pins. Moreover, it is desirable to avoid having the lower surface of the web bear upon the upper surface of the tractor chassis.

In the aforementioned concurrently filed application of Alan F. Seitz, there is claimed means for providing belt tensioning by resiliently deflectable elements located under the drive path of the belt. The specific embodiment claimed therein is one in which compression springs bias a platform-type member outwardly against the belt.

It is an object of the present invention to provide a novel drive tractor for web material which provides resilient tensioning of a drive belt between its guide surfaces to bias the belt against an overlying guide surface and which employs an integrally formed member to provide the belt tensioning means.

It is also an object to provide such a drive tractor for which the components may be fabricated readily and relatively economically and which may be easily assembled to provide a tractor which will enjoy long life in operation.

A specific object is to provide such a tractor in which the resiliently deflectable means is a unitary member utilizing the inherent resiliency of the synthetic resin from which is molded to provide the resilient deflection.

SUMMARY OF THE INVENTION

It has now been found that the foregoing and related objects can be readily attained in the drive tractor which includes a chassis having a pair of spaced transversely extending apertures therein with at least one aperture being adjacent an end thereof. Extending about the chassis generally perpendicularly to the axes of the apertures is a flexible endless belt which defines a closed path of travel thereabout. The belt has an outer driving surface to engage the web material and an inner driven surface which is engaged with a drive pulley rotatably mounted in the chassis aperture adjacent the end thereof. The drive pulley has an aperture therethrough for receiving a drive shaft to effect its rotation and thereby that of the belt. Adjacent the end of the chassis spaced from the drive pulley is a convexly arcuate belt support means, and the belt extends about the support means and pulley in a web drive path therebetween. Guide means on the chassis overlies the web drive path, and integrally formed belt tensioning means movably supported on the chassis below the belt drive path is resiliently deflectable in a direction normal thereto and biases the belt outwardly against the guide means. The belt tensioning means comprises an integrally formed member having a support plate portion bearing on the lower surface of the belt and at least one deflectable leg portion slidably received in a cooperating recess in the chassis. The deflectable leg portion normally urges the support plate portion against the belt and thereby the belt against the guide means.

It its preferred form, the resiliently deflectable member has a spaced pair of depending leg portions slidably received in a cooperating recess of the chassis. The pair of leg portions desirably depend at converging angles, and the cooperating chassis recess has a base surface extending generally parallel to the support plate portion and side surfaces diverging from the base surface at angles greater than the converging angles of the depending leg portions. The leg portions are slidable on the base surface and are greater in vertical dimension than the vertical dimension of the recess so that depression of the support plate portion towards the base surface will produce deflection of the leg portions. Moreover, the leg portions desirably have enlarged arcuate bearing surfaces at their free ends.

Desirably, the chassis includes a guide channel which extends pependicularly to the drive path, and the support plate portion has a guide leg portion extending generally perpendicularly to its lower surface and slidably seated in the guide channel of the chassis to effect guidance of the support plate position in its movement. This guide leg portion is intermediate the depending leg portions.

In its preferred form, the guide means is a cover pivotably mounted on the chassis and having an elongated passage therein above the belt tensioning means. The belt has a multiplicity of drive pins spaced along its outer drive surface, and these pins extend upwardly into the passage of the cover during passage of the belt along the web drive path.

The tractor may be of the bidirectional type and have a vertically spaced pair of web drive paths, a pair of web guide means and a pair of belt tensioning means.

Thus, in the tractors of this invention, the belt and the web being driven thereby are constantly under tension in the drive path to provide a rectilinear path for the web tightly against the guide means or cover. Varying thicknesses of webs can be accommodated readily, and any tendency for the belt to dip between its support surfaces as the result of intermittent or reversing motion of the drive pulley is essentially overcome.

DETAILED DESCRIPTION OF THE ILLUSTRATED EMBODIMENT

Figure 1:
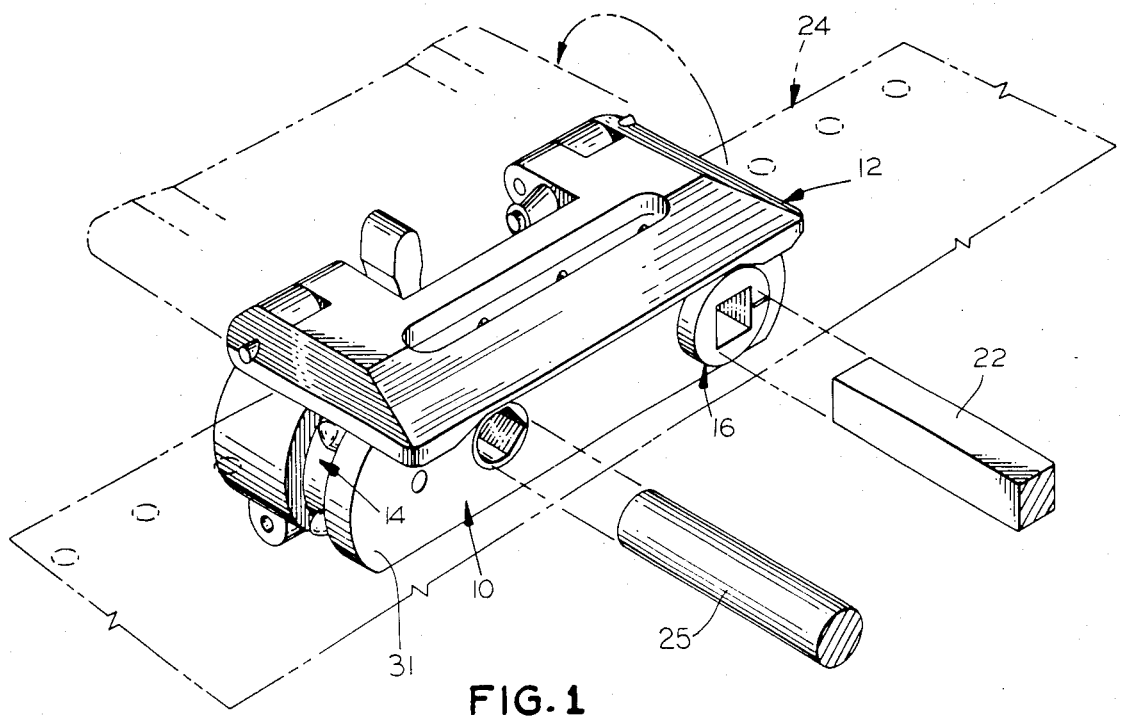
FIG. 1 is a perspective view of a tractor embodying the invention with the drive and support shafts fragmentarily illustrated in solid line, with the paper shown in phantom line, and with the cover shown in solid line in the closed, operative position and in phantom line in the open position.
Figure 2:
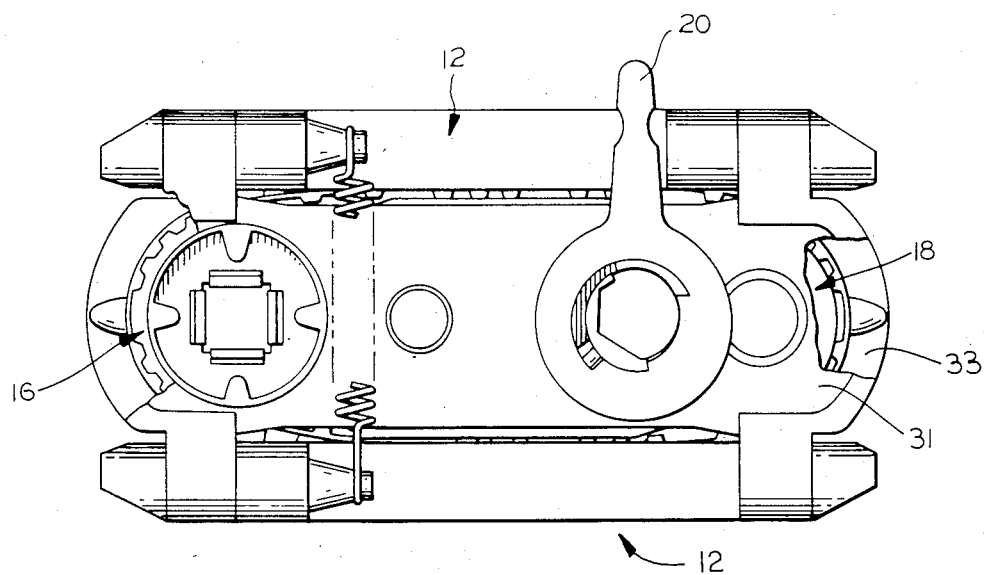
FIG. 2 is a side elevational view of the opposite side thereof with the portions of the chassis broken away for purposes of illustration.

Turning first to FIGS. 1 and 2 of the drawings, therein illustrated a tractor embodying the present invention and comprised of a chassis generally designated by the numeral 10, a cover generally designated by the numeral 12, a drive belt generally designated by the numeral 14, a drive pulley generally designated by the numeral 16, an arcuate guide surface generally designated by the numeral 18, and a cam lock subassembly generally designated by the numeral 20. The chassis 10 is adapted to mount a second cover 12 to function as a bidirectional tractor as shown in FIG. 2.

Also shown partially in phantom line are fragmentary portions of the drive shaft 22 of rectangular cross section and the support shaft 25 of circular cross section upon which a pair of tractors are mounted (only one is shown). A web of perforated paper generally designated by the numeral 24 is shown disposed between the cover 12 and belt 14 to be driven along a path defined by the upper surface of the belt 14 when the drive shaft 22 is rotated by the printer or other powered device (not shown), as is conventional.

The general features of construction of the belt 14, cover 12, drive pulley or sprocket 16 and cam lock subassembly 20 are generally as described in U.S. Pat. Nos. 4,130,320, 4,194,660, and 4,315,585. The description thereof in each of these patents is incorporated herein by reference.

In this embodiment, the tractor has a single pulley 16 which is the drive pulley, and the arcuate guide surface 18 at the other end of the chassis 10 cooperates therewith to define the belt travel path. The axis or center for the radius of curvature for the surface 18 is indicated by the numeral 36 and the radius is equal to the radius of the root diameter of the teeth in the pulley 16. The belt 14 has a diameter which will provide a greater lineal length than required to provide a rectilinear path between the drive pulley 16 and arcuate guide surface 18 so that it normally bows or arches outwardly from such a rectilinear path. In this fashion, some of the stresses occuring during operation may be readily accommodated within the excess length, while there is also provided an inherent biasing pressure on the web.

The preferred belt tensioning mechanism of the present invention is illustrated in FIGS. 3-6 wherein it can be seen that the chassis 10 is comprised of a chassis body generally designated by the numeral 30 and having a separate side member or plate 31 which assembles therewith. The body 30 is integrally molded with a side face 33 and a transversely extending spacer portion 35 against which mounts the side member 31. Apertures extend through the body 30 and side member 31 for passage of the drive shaft 22 and support shaft 25 therethrough, and the drive pulley 16 is rotatably seated in the spacing between the side member 31 and side face 33 at one end of the chassis body 30.

The spacer portion 35 of the chassis body 30 is molded with top and bottom recesses 32 intermediate the ends thereof and with a pair of spaced guide bosses 38 centered above the base of each of the recesses 32 and defining a vertical channel 39 therebetween. The spacer portion 35 of the chassis body 30 also is molded with surfaces 40 which slope inwardly towards the ends of the chassis body 30 on either side of the recesses 32. The recesses 32 have a generally rectilinear base surface 41 and diverging side faces 43 at the outer extremities of which are the sloping surfaces 40.

Seated in each of the recesses 32 is a spring biasing member generally designated by the numeral 42 and having a support plate portion 45, a guide leg portion 46 and spring leg portions 44 with enlarged bearing portions at their free ends.

Figure 3:
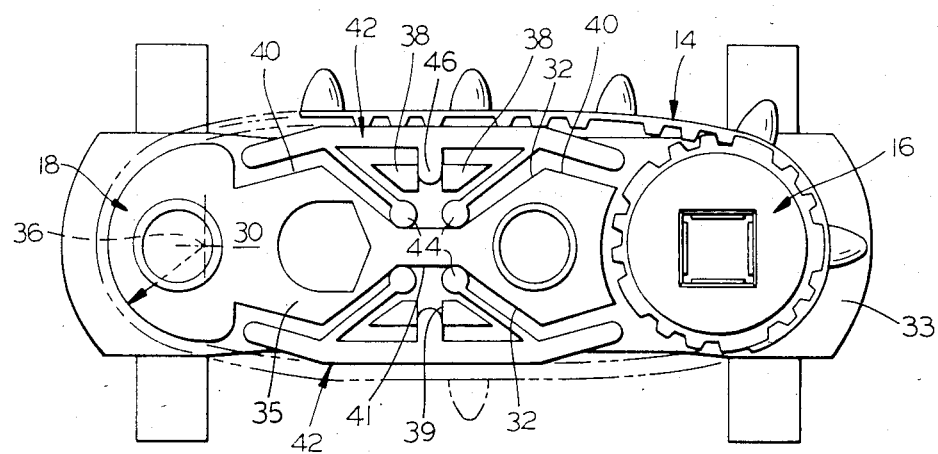
FIG. 3 is an elevational view of the side of the tractor seen in FIG. 1 with the side member and cover removed and showing the belt partially in phantom line.
Figure 4:
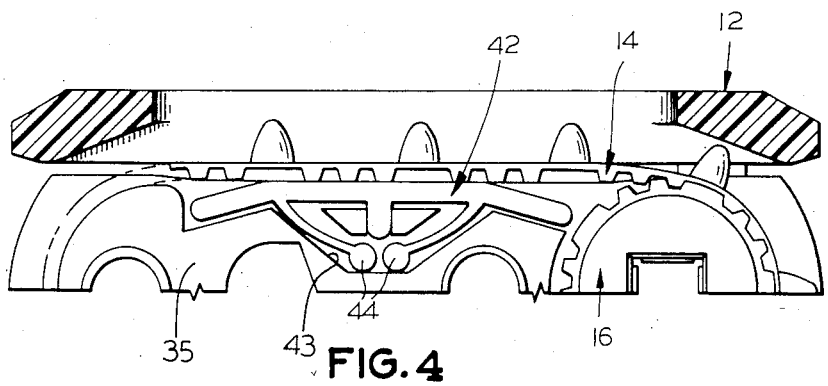
FIG. 4 is a fragmentary side elevational view similar to FIG. 3 with the cover fragmentarily illustrated in section.
Figure 6:
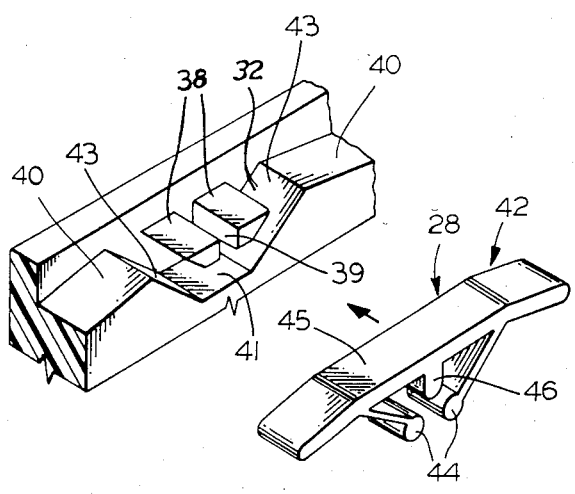
FIG. 6 is a fragmentary sectional view along the line 6—6 of FIG. 4.
Figure 5:
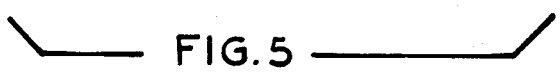
FIG. 5 is an exploded, fragmentary view of a portion of the frame and tensioning member.
Figure 7:
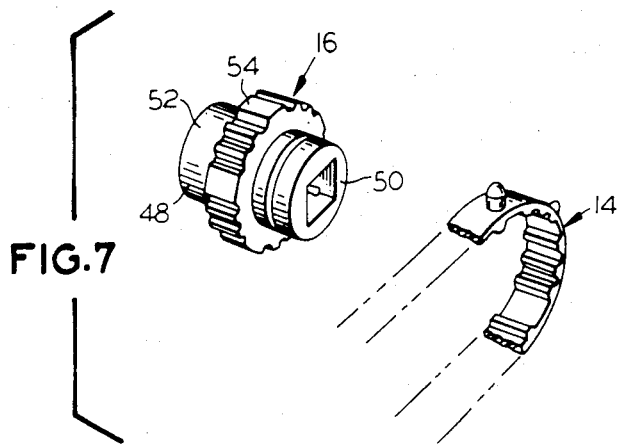
FIG. 7 is a perspective view of the drive pulley and a fragmentary portion of the belt.
Figures 8, 9:
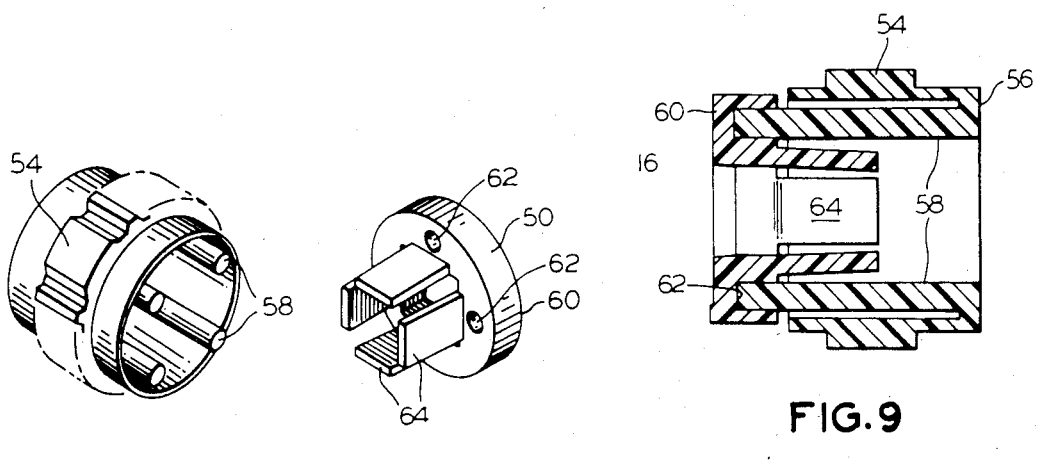
FIG. 8 is an exploded view of the drive pulley elements.
FIG. 9 is an axial sectional view of the drive pulley drawn to an enlarged scale.

As will be readily appreciated, the spring biasing member 42 is integrally molded from a synthetic resin providing resilient deformability for the spring leg portions 44 which are slidable in the sloping channel defined between the bosses 38 and the sloping faces 43 of the recesses 32. The guide leg 46 on the member 42 slides in the vertical channel 39 between the bosses 38. The upper surface of the support plate portion 45 of the spring biasing member 42 is normally urged by the spring leg portions 44 of a position above the plane defined by the bottom surface of the cover 12 in its closed position. However, as seen in FIGS. 3 and 4, when the cover 12 is closed and paper is disposed upon the belt 14 and below the cover 12, the belt 14 will be depressed from the position shown in FIG. 3 to that shown in FIG. 4, causing the leg portions 44 to deflect and producing a biasing pressure urging the member 42 and thereby the belt 14 against the inner or lower surface of the cover 12. This ensures that paper 24 being transported will travel in a path defined by the lower surface of the cover 12 and maintain the belt 14 and web 24 in tension in the rectilinear drive path between the drive pulley 16 and arcuate guide surface 18.

The lower belt tensioning means 42 does not, in the illustrated embodiment, bias the belt 14 against a cover or like guide surface since this is not assembled as a bidirectional tractor. However, it similarly biases the belt 14 outwardly to maintain tension thereon and mimimize deflection inwardly of the chassis 10.

As assembled, the spring biasing member 42 are held in assembly with the spacer portion 35 by the side member 31 and the belt 14.

It can be seen that the spring leg portions 44 will freely slide on the sloping surfaces provided by the side faces 43 of the recesses 32 as well as upon the base surface 41, and that their enlarged end portions function both as bearing surfaces to minimize friction and as means to enhance the deflection of the relatively thin portions extending between the enlarged end portions and the support plate portion 45. Moreover, the leg portions 44 are of greater vertical dimension than the recess 32 to ensure deflection when the support plate portion 45 is depressed. Lastly, it should be noted that the angle at which the sides 43 of the recess 32 diverge from its base surface 41 is greater than the angle at which the spring leg portions 44 converge from the support plate portion 45.

As is more fully described and is claimed in the concurrently filed application of Alan F. Seitz, Ser. No. 407,105 filed Aug. 11, 1982 and of Karl G. Seitz, Ser. No. 407,104 filed Aug. 11, 1982, the illustrated tractor employs a drive shaft clamping construction which will readily accommodate and compensate for aberrations in the drive shaft and variations in spacing between the drive and support shafts occuring during operation of the tractor. Because the features of that development are not essential to the present invention, reference may be made to the copending applications for more detailed description if so desired.

Turning now to the detailed constuction of the drive pulley 16 shown in FIGS. 1-4 and 7-11, this pulley is of two piece construction and comprises the sprocket member 48 and the spring clamp member 50. The sprocket member 48 has a generally cylindrical wall 52 with the sprocket teeth 54 extending circumferentially thereabout, an end wall 56, and four cylindrical posts 58 on the end wall 56 spaced inwardly from the cylindrical wall 52 and extending axially to a point beyond the opposite end thereof. The spring clamp member 50 has an end wall 60 providing a square aperture therethrough and has four recesses 62 in its inner surface frictionally seating the posts 58. Inwardly extending fingers 64 project from the inner surface of the end wall 60 about the aperture and are inclined therefrom to define at their free end, a rectangular passage of lesser cross section than that of the aperture in the end wall 60, and also lesser than the cross section of the drive shaft 22.

Figure 10:
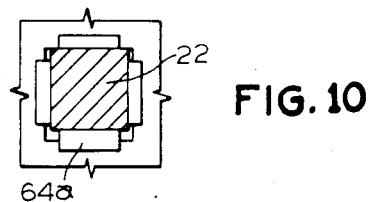
FIGS. 10 and 11 are fragmentary transverse sectional views of the drive pulley as assembled on the drive shaft diagrammatically showing the deflection of the fingers engaging the drive shaft.
Figure 11:
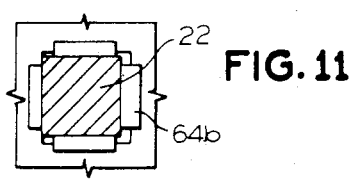

When the drive pulley 16 is seated on the drive shaft 22, resilient deflection to accomodate varying positions of the drive shaft 22 internally therewith is provided by two portions of the assmbly. First of all, the spring fingers 64 are deflected upon insertion of the shaft 22 with the fingers 64 thereby being spring biased against the side surfaces of the shaft 22. Variations in the shaft positioning within the larger aperture defined by the end walls of the pulley 16 during operation of the bracket is accommodated by further flexing of the fingers 64. As seen in FIGS. 10 and 11, one finger 64a, or 64b, is shown more greatly deflected to illustrate the manner in which the fingers 64 accommodate the shaft position variation.

In addition, the entire spring clamp member 50 which provides the shaft gripping portion of the drive pulley 16 may move to a limited extent by resilient deflection of the posts 58 upon which it is carried. However, the axis of rotation of the drive pulley 16 remains constant, and the axial spacing between the drive pulley 16 and the arcuate guide surface 18 thereby remains constant.

It can be seen that the resiliently deflectable support plate biases the belt against the inner surface of the cover. When paper or other web material is introduced therebetween, the support plate will be deflected downwardly by the thickness of the web material, but it will hold the web material lightly against the cover during its passage therebetween, thereby providing a rectilinear drive path between the belt guide and drive surfaces. When the belt is subjected to forces which tend to produce downward deflection in the drive path such as rapid reversal of direction or rapid intermittent movement (common in printers), the tendency for deflection is offset by the spring biasing pressure acting on the inner surface thereof while the extra length absorbs some of the stresses adjacent the points of support on the drive pulley and arcuate guide surface. Thus, the web material is fully seated on the belt in its drive path during operation and the web is under constant and substantially uniform tension to eliminate variations in line spacing, etc.

As will be appreciated, the pulleys of the tractors of the present invention may be of the type having teeth formed therein to engage cooperating teeth on the driven surface of the belt, such as illustrated in the aforementioned Seitz Patents, or they may employ a friction surface to engage a frictionally driven surface on the belt, or they may employ any other suitable means for effecting driving engagement therebetween.

As is conventional for larger tractors, an idler pulley may be employed at the other end of the chassis to provide the belt support surface rather than the arcuate shoe surface of the illustrated embodiment. Such idler pulley assemblies are shown in the aforementioned Seitz Patents. This type of assembly may have a third aperture through the chassis, for the idler pulley, the support shaft receiving aperture may be an aperture or passage through the idler pulley with that pulley rotating about a fixed axis and the clamping means being supported on the chassis outwardly thereof and in a fixed position relative thereto.

Thus, it can be seen from the foregoing detailed specification and attached drawings that the drive tractor of the present invention provides a unitary belt tensioning mechanism which readily offsets the forces tending to deflect the belt downwardly between its drive and guide surfaces during operation of the tractor, thus maintaining the desired tension thereon and on the web material being driven thereby. It may be readily molded and assembled to the body of the tractor to provide a long-lived assembly.

Having thus described the invention, what is claimed is:

1. In a drive tractor for web material adapted to be mounted on a printer or the like, the combination comprising:
   A. a chassis having a pair of spaced transversely extending apertures therein for receiving a pair of shafts of an associated printer or like device, at least one of said apertures being adjacent an end thereof;
   B. a flexible endless one-piece belt extending about said chassis in a plane generally perpendicular to the axes of said apertures, said belt defining a closed path of travel thereabout and having an outer driving surface adapted to engage the associated web material and an inner driven surface;
   C. a pulley rotatably mounted in said one chassis aperture and in engagement with said driven surface of said belt, said pulley having an aperture therethrough for receiving a drive shaft of an associated printer to effect rotation of said pulley and thereby said belt, the other of said apertures being adapted to receive a support shaft of the associated printer;
   D. convexly arcuate belt support means adjacent the end of said chassis spaced from said drive pulley, said belt extending about said support means and pulley and extending in a web drive path therebetween;
   E. guide means mounted for reciprocal movement on said chassis between a closed position overlying said web drive path and an open position; and
   F. belt tensioning means movably supported on said chassis below said belt in the area of said web drive path for resilient deflection in a direction normal thereto, said belt tensioning means being integrally formed with a support plate portion elongated in the direction of said web drive path and having a portion of the length of its upper surface extending parallel to the plane of said web drive path, said surface portion bearing on the lower surface of said belt, said belt tensioning means also including at least one resiliently deflectable leg portion depending therefrom and slidably seated in a cooperating recess in said chassis, said deflectable leg portions normally urging said support plate portion against said belt and thereby said belt against said guide means.

2. The tractor in accordance with claim 1 wherein said belt tensioning means has a spaced pair of depending leg portions on said support plate portion slidably seated in cooperating recesses in said chassis.

3. The tractor in accordance with claim 2 wherein said deflectable leg portions depend from said support plate portion at converging angles.

4. In a drive tractor for web material adapted to be mounted on a printer or the like, the combination comprising:
   A. a chassis having a pair of spaced transversely extending apertures therein for receiving a pair of shafts of an associated printer or like device, at least one of said apertures being adjacent an end thereof;
   B. a flexible endless one-piece belt extending about said chassis in a plane generally perpendicular to the axes of said apertures, said belt defining a closed path of travel thereabout and having an outer driving surface adapted to engage the associated web material and an inner driven surface;
   C. a pulley rotatably mounted in said one chassis aperture and in engagement with said driven surface of said belt, said pulley having an aperture therethrough for receiving a drive shaft of an associated printer to effect rotation of said pulley and thereby said belt, the other of said apertures being adapted to receive a support shaft of the associated printer;
   D. convexly arcuate belt support means adjacent the end of said chassis spaced from said drive pulley, said belt extending about said support means and pulley and extending in a web drive path therebetween;
   E. guide means mounted for reciprocal movement on said chassis between a closed position overlying said web drive path and an open position; and
   F. belt tensioning means movably supported on said chassis below said belt in the area of said web drive path for resilient deflection in a direction normal thereto, said belt tensioning means being integrally formed with a support plate portion elongated in the direction of said web drive path and having a portion of the length of its upper surface extending parallel to the plane of said web drive path, said surface portion bearing on the lower surface of said belt, said belt tensioning means having a spaced pair of resiliently deflectable depending leg portions on said support plate portion slidably seated in cooperating recesses in said chassis, said deflectable leg portions depending from said support plate portion at converging angles and said cooperating recesses of said chassis having a base surface extending generally parallel to said support plate portion, said leg portions being slidable upon said base surface and being greater in vertical dimension than the vertical dimension of said recess whereby depression of said support plate portion towards said base surface will produce deflection of said leg portions, said deflectable leg portions normally urging said support plate portion against said belt and thereby said belt against said guide means.

5. The tractor in accordance with claim 4 wherein said recess has side surfaces diverging from said base surface at angles greater than the converging angles of said leg portions and wherein said leg portions extend in spaced relationship therealong.

6. The tractor in accordance with claim 4 wherein said deflectable leg portions have enlarged arcuate bearing surfaces at their free ends.

7. In a drive tractor for web material adapted to be mounted on a printer or the like, the combination comprising:
   A. a chassis having a pair of spaced transversely extending apertures therein for receiving a pair of shafts of an associated printer or like device, at least one of said apertures being adjacent an end thereof;
   B. a flexible endless one-piece belt extending about said chassis in a plane generally perpendicular to the axes of said apertures, said belt defining a closed path of travel thereabout and having an outer driving surface adapted to engage the associated web material and an inner driven surface;

C. a pulley rotatably mounted in said one chassis aperture and in engagement with said driven surface of said belt, said pulley having an aperture therethrough for receiving a drive shaft of an associated printer to effect rotation of said pulley and thereby said belt, the other of said apertures being adapted to receive a support shaft of the associated printer;

D. convexly arcuate belt support means adjacent the end of said chassis spaced from said drive pulley, said belt extending about said support means and pulley and extending in a web drive path therebetween;

E. guide means mounted for reciprocal movement on said chassis between a closed position overlying said web drive path and an open position; and F. belt tensioning means movably supported on said chassis below said belt in the area of said web drive path for resilient deflection in a direction normal thereto, said belt tensioning means being integrally formed with a support plate portion elongated in the direction of said web drive path and having a portion of the length of its upper surface extending parallel to the plane of said web drive path, said surface portion bearing on the lower surface of said belt, said belt tensioning means including at least one resiliently deflectable leg portion depending from and slidably seated in a cooperating recess in said chassis, said support plate portions having a guide leg portion extending generally perpendicularly to its lower surface, and said chassis having a guide channel therein slidably seating said guide leg portion for movement of said support plate portion generally perpendicularly to said web drive path, said deflectable leg portions normally urging said support plate portion against said belt and thereby said belt against said guide means.

8. The tractor in accordance with claim 7 wherein said belt tensioning means has a spaced pair of depending leg portions on said support plate portion slidably seated in a pair of cooperating recesses in said chassis, and wherein said guide leg portion is disposed intermediate said pair of depending leg portions.

9. The tractor in accordance with claim 8 wherein deflectable leg portions depend from said support plate portion at converging angles and wherein said cooperating recess of said chassis has a base surface extending generally parallel to said support plate portion, said leg portions being slidable upon said base surface and being greater in vertical dimension than the vertical dimension of said recess whereby depression of said support plate portion towards said base surface will produce said deflection of said leg portions.

10. The tractor in accordance with claim 9 wherein said deflectable leg portions have enlarged arcuate bearing surfaces at their free ends, and wherein said guide channel is formed above said base surface of said recess intermediate said side surfaces thereof.

11. The tractor in accordance with claim 1 wherein a second belt tensioning means is provided on said chassis and resiliently bears upon said belt between said arcuate belt support means and pulley as said belt extends therebetween on the portion of the path of belt travel opposite said first mentioned web drive path, said second belt tensioning means being substantially identical in construction and operation to said first mentioned belt tensioning means.

12. The tractor in accordance with claim 11 wherein each of said belt tensioning means has a spaced pair of depending leg portions on said support plate portion slidably seated in a cooperating recess in said chassis.

13. In a drive tractor for web material adapted to be mounted on a printer or the like, the combination comprising:

A. a chassis having a pair of spaced transversely extending apertures therein for receiving a pair of shafts of an associated printer or like device, at least one of said apertures being adjacent an end thereof;

B. a flexible endless one-piece belt extending about said chassis in a plane generally perpendicular to the axes of said apertures, said belt defining a closed path of travel thereabout and having an outer driving surface adapted to engage the associated web material and an inner driven surface;

C. a pulley rotatably mounted in said one chassis aperture and in engagement with said driven surface of said belt, said pulley having an aperture therethrough for receiving a drive shaft of an associated printer to effect rotation of said pulley and thereby said belt, the other of said apertures being adapted to receive a support shaft of the associated printer;

D. convexly arcuate belt support means adjacent the end of said chassis spaced from said drive pulley, said belt extending about said support means and pulley and extending in a web drive path therebetween;

E. guide means mounted for reciprocal movement on said chassis between a closed position overlying said web drive path and an open position; and F. a pair of opposed belt tensioning means movably supported on said chassis to bear upon the inner surface of said belt in the area of said web drive path between said pulley and belt support means, said belt tensioning means being movable for resilient deflection in a direction normal thereto, each of said belt tensioning means being integrally formed with a support plate portion elongated in the direction of said web drive path and having a portion of the length to its upper surface extending parallel to the plane of said web drive path, said surface portion bearing on the inner surface of said belt, each of said belt tensioning means having a spaced pair of resiliently deflectable depending leg portions depending from said support plate portion at converging angles slidably seated in cooperating recesses in said chassis, said cooperating recesses of said chassis having a base surface extending generally parallel to said support plate portions, said leg portions being slidable upon said base surface and being greater in vertical dimension than the vertical dimension of said recesses whereby depression of said support plate portion towards said base surface will provide deflection of said leg portions, said deflectable leg portions normally urging said support plate portion against said belt and thereby said belt against said guide means.

14. In a drive tractor for web material adapted to be mounted on a printer or the like, the combination comprising:

A. a chassis having a pair of spaced transversely extending apertures therein for receiving a pair of shafts of an associated printer or like device, at least one of said apertures being adjacent an end thereof;

B. a flexible endless one-piece belt extending about said chassis in a plane generally perpendicular to the axes of said apertures, said belt defining a closed path of travel thereabout and having an outer driving surface adapted to engage the associated web material and an inner driven surface;

C. a pulley rotatably mounted in said one chassis aperture and in engagement with said driven surface of said belt, said pulley having an aperture therethrough for receiving a drive shaft of an associated printer to effect rotation of said pulley and thereby said belt, the other of said apertures being adapted to receive a support shaft of the associated printer;

D. convexly arcuate belt support means adjacent the end of said chassis spaced from said drive pulley, said belt extending about said support means and pulley and extending in a web drive path therebetween;

E. guide means mounted for reciprocal movement of said chassis between a closed position overlying said web drive path and an open position; and F. a pair of belt tensioning means movably supported on said chassis to bear upon the inner surface of said belt in the area of said web drive paths between said pulley and belt support means, said belt tensioning means being movable for resilient deflection in a direction normal thereto, each of said belt tensioning means being integrally formed with a support plate portion elongated in the direction of said web drive path and having a portion of the length of its upper surface extending parallel to the plane of said web drive path, said surface portion bearing on the inner surface of said belt, each of said belt tensioning means having a spaced pair of resiliently deflectable depending leg portions slidably seated in a cooperating recess in said chassis, each said support plate portion further having a guide leg portion extending generally perpendicular to its inner surface, and said chassis has guide channels slidably seating said guide leg portions for movement of said support plate portions generally perpendicularly to the belt drive path, and wherein said deflectable leg portions depend from said support plate portions at converging angles and said guide leg portions are disposed intermediate said pairs of depending leg portions, and wherein said cooperating recesses of said chassis have a base surface extending generally parallel to said support plate portions, said leg portions being slidable upon said base surface and being greater in vertical dimension than the vertical dimension of said recess whereby depression of said support plate portions towards said base surface will produce deflection of said leg portions, said deflectable leg portions normally urging said support plate portion against said belt and thereby said belt against said guide means.

15. The tractor in accordance with claim 1 wherein said tractor is adapted for bidirectional operation and has a vertically spaced pair of web drive paths, a pair of guide means outwardly of the outer surface of said belt extending in spaced parallel relationship along the upper and lower drive paths and a pair of said belt tensioning means.

16. The tractor in accordance with claim 15 wherein each of the support plate portions of said belt tensioning means has a spaced pair of depending leg portions slidably seated in cooperating recesses in said chassis.

17. In a drive tractor for web material adapted to be mounted on a printer or the like for bidirectional operation, the combination comprising:

A. a chassis having a pair of spaced transversely extending apertures therein for receiving a pair of shafts of an associated printer or like device, at least one of said apertures being adjacent an end thereof;

B. a flexible endless one-piece belt extending about said chassis in a plane generally perpendicular to the axes of said apertures, said belt defining a closed path of travel thereabout and having an outer driving surface adapted to engage the associated web material and an inner driven surface;

C. a pulley rotatably mounted in said one chassis aperture and in engagement with said driven surface of said belt, said pulley having an aperture therethrough for receiving a drive shaft of an associated printer to effect rotation of said pulley and thereby said belt, the other of said apertures being adapted to receive a support shaft of the associated printer;

D. convexly arcuate belt support means adjacent the end of said chassis spaced from said drive pulley, said belt extending about said support means and pulley and extending in a pair of vertically spaced web drive paths therebetween;

E. a pair of guide means outwardly of the outer surface of said belt extending in spaced parallel relationship along the upper and lower drive paths and mounted for reciprocal movement of said chassis between a closed position overlying said web drive path and an open position; and F. a pair of belt tensioning means movably supported on said chassis to bear upon the inner surface of said belt in the area of said web drive paths between said pulley and belt support means, said belt tensioning means being movable for resilient deflection in a direction normal thereto, each of said belt tensioning means being integrally formed with a support plate portion elongated in the direction of said web drive path and having a portion of the length of its upper surface extending parallel to the plane of said web drive path, said surface portion bearing on the lower surface of said belt, each of belt tensioning means having a spaced pair of resiliently deflectable leg portions depending from said support plate portion and slidably seated in cooperating recesses in said chassis, said deflectable leg portions depending from said support plate portion at converging angles, said recesses of said chassis having a base surface extending parallel to said support plate portion, said leg portions being slidable upon said base surfaces and being greater in vertical dimension than the vertical dimension of said recesses whereby depression of said support plate portion towards said base surface will produce deflection of said leg portions, said deflectable leg portions normally urging said support plate portion against said belt and thereby said belt against said guide means.

18. The tractor in accordance with claim 17 wherein the support plate portion of each of said belt tensioning means has a guide leg portion extending generally perpendicularly to its lower surface and said chassis has a guide channel slidably seating said guide leg portion for movement of said support plate portion generally perpendicularly to the belt drive path, said guide leg portion being intermediate said deflectable leg portions.

* * * * *